G. W. ROOT.
Strainer for Tea and Coffee Pots.
No. 225,766. Patented Mar. 23, 1880.
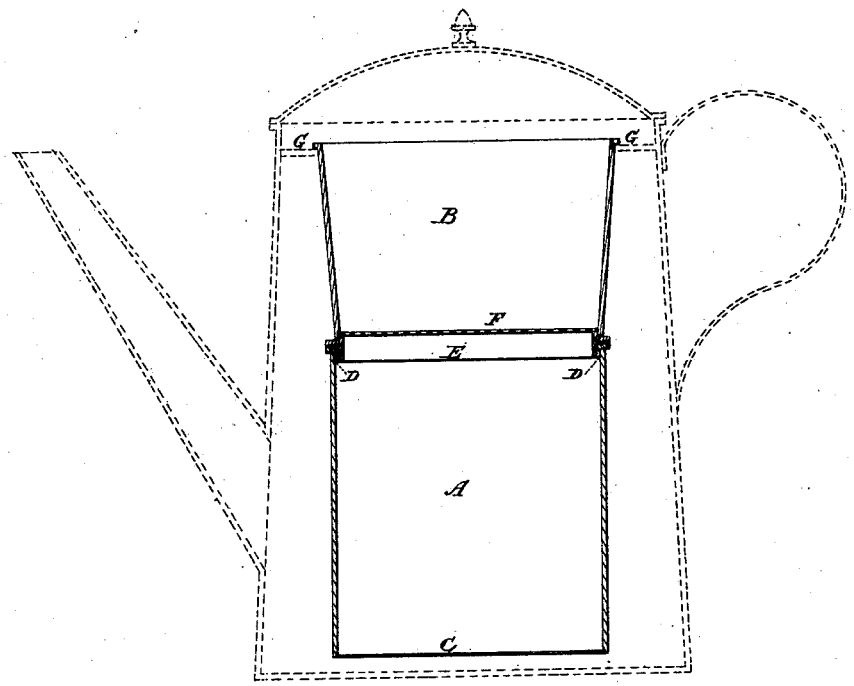
WITNESSES
INVENTOR
George W. Root
per
Charles H. Nash
Attorney
N. PETERS, PHOTO-LITHOGRAPHER, WASHINGTON, D. C.

United States Patent Office.

GEORGE W. ROOT, OF NEW YORK, N. Y., ASSIGNOR TO HIMSELF, MERRITT R. SCOFIELD, AND ARTHUR R. STARK, OF STAMFORD, CONN.

STRAINER FOR TEA AND COFFEE POTS.

SPECIFICATION forming part of Letters Patent No. 225,766, dated March 23, 1880.

Application filed August 6, 1879.

*To all whom it may concern:*

Be it known that I, GEORGE W. ROOT, of the city, county, and State of New York, have invented certain new and useful Improvements in Tea and Coffee Pots, of which the following is a full, clear, and exact description, which will enable others skilled in the art to make and use the same.

The drawing represents a sectional side elevation.

Similar letters of reference indicate corresponding parts.

A represents the lower section, and B the upper section, of a strainer and retainer for tea-leaves or coffee-grounds. The lower section has its bottom made of fine wire-gauze, C, and around the inner periphery, at its top, there is a fixed metal band, D, with a thread cut thereon, forming a screw-connection for the upper section, B, which has a corresponding thread cut on the outer periphery of the metallic band E, soldered to or otherwise rigidly attached to the upper sheet-metal section.

F is a strainer situated at or near the base of the upper section.

It will here be observed that when the said device is used for tea the strainer at the bottom of the lower section is made slightly coarser.

The advantages and operation of my invention are as follows: The tea or coffee having been placed within the lower section, the upper section is screwed thereon. This top section serves to hold the tea or coffee grounds confined within the lower section, the joint being perfectly tight, so that in tipping the tea or coffee pot in process of pouring, no grounds or tea-leaves can possibly find their way into the pot; and, furthermore, the upper section having slightly-tapering sides enables it to fit any ordinary-sized pot; but this I do not make special claim to, as a flange, G, around its upper rim would answer the same purpose.

The only addition necessary to add to the coffee-pot is a plain ring or other suitable projection to form a rest for the support of the sections above described.

The lower section, when in position, extends down to within a half inch (more or less) from the bottom of the pot.

It will further be observed that by the use of the above-described invention, as soon as the tea or coffee pot is filled to a height even with the strainer in the upper section, the water will show itself in the upper section, and thus it will not be necessary to remove any of its parts to ascertain the fact.

I am aware that it is not new to place confining-chambers for tea-leaves or coffee-grounds within the pot; but all such have heretofore been made with joints, which soon work loose, and, from careless handling, very soon get out of order, whereas by my invention the sections are not only stiffened at their weakest points, but an absolutely tight and reliable joint is made.

I am also aware that a screw-thread connection has been employed in the two parts of a coffee-strainer; but in such case the whole device was made entirely of cast metal, and no separately-constructed rings were combined with sheet-metal cylinders in such way as to stiffen and strengthen the whole device, and also afford a supporting-ledge for a strainer-disk in a manner resembling my device.

Having thus described my invention, what I claim as new, and desire to secure by Letters Patent, is—

The combination, in a strainer for tea and coffee pots, of the sheet-metal cylinders, the screw-threaded cast-metal bands or flanged rings D E, and the strainer supported on the ring E, substantially as shown and described.

GEORGE W. ROOT.

Witnesses:
CHARLES H. NASH,
WILLIAM H. LEWIS.